United States Patent
Koike et al.

(10) Patent No.: US 7,566,214 B2
(45) Date of Patent: Jul. 28, 2009

(54) DIE CLAMPING UNIT AND DIE CLAMPING METHOD

(75) Inventors: Jun Koike, Shizuoka-ken (JP); Takaki Miyauchi, Numazu (JP); Makoto Nishizawa, Numazu (JP); Nobuyuki Muroi, Mishima (JP); Haruyuki Matsubayashi, Numazu (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 807 days.

(21) Appl. No.: 11/043,936

(22) Filed: Jan. 28, 2005

(65) Prior Publication Data
US 2005/0170037 A1    Aug. 4, 2005

(30) Foreign Application Priority Data
Jan. 30, 2004  (JP)  ............................. 2004-023975
Jan. 19, 2005  (JP)  ............................. 2005-011682

(51) Int. Cl.
*B29C 45/64*  (2006.01)
(52) U.S. Cl. ...................... 425/150; 425/595
(58) Field of Classification Search ................ 425/190, 425/589, 595, 150
See application file for complete search history.

(56) References Cited
U.S. PATENT DOCUMENTS 5,135,385 A * 8/1992 Fukuzawa et al. ............ 425/595
5,863,474 A * 1/1999 Ito et al. ...................... 425/595
6,050,804 A   4/2000 Tamaki et al.
6,655,949 B2 * 12/2003 Chikazawa et al. ......... 425/595
6,821,104 B2 * 11/2004 Kubota et al. ............... 425/150
6,932,924 B2 * 8/2005 Nishizawa et al. .......... 425/190
2002/0180132 A1  12/2002 Kubota et al.
2003/0189267 A1 * 10/2003 Nishizawa et al. .......... 425/595

FOREIGN PATENT DOCUMENTS

| AT | 396 903 B | 12/1993 |
| DE | 10103983 C1 | 4/2002 |
| DE | 103166199 A1 | 10/2003 |
| EP | 1378335 A1 | 1/2004 |
| JP | 6-182838 | 7/1994 |
| JP | 10-296739 | 11/1998 |
| JP | 2002-127216 | 5/2002 |
| JP | 2004-314491 | 11/2004 |

* cited by examiner

*Primary Examiner*—James Mackey
(74) *Attorney, Agent, or Firm*—DLA Piper LLP (US)

(57) ABSTRACT

Used in a method of this invention is a die clamping unit, which comprises a tie bar movably attached to a stationary platen, a halfnut positioning servomotor which advances and retreats the tie bar, a halfnut which is provided on a movable platen and fixes the movable platen and the tie bar together by engaging the tie bar, an engaging mechanism which engages the halfnut with the tie bar, a hydraulic die clamping cylinder which presses the stationary platen and the movable platen, and a control device which controls the halfnut positioning servomotor and the hydraulic cylinder. The control device drives the halfnut positioning servomotor to remove a clearance between the halfnut and an engaging groove of the tie bar before a die clamping process carried out by the hydraulic cylinder.

2 Claims, 2 Drawing Sheets

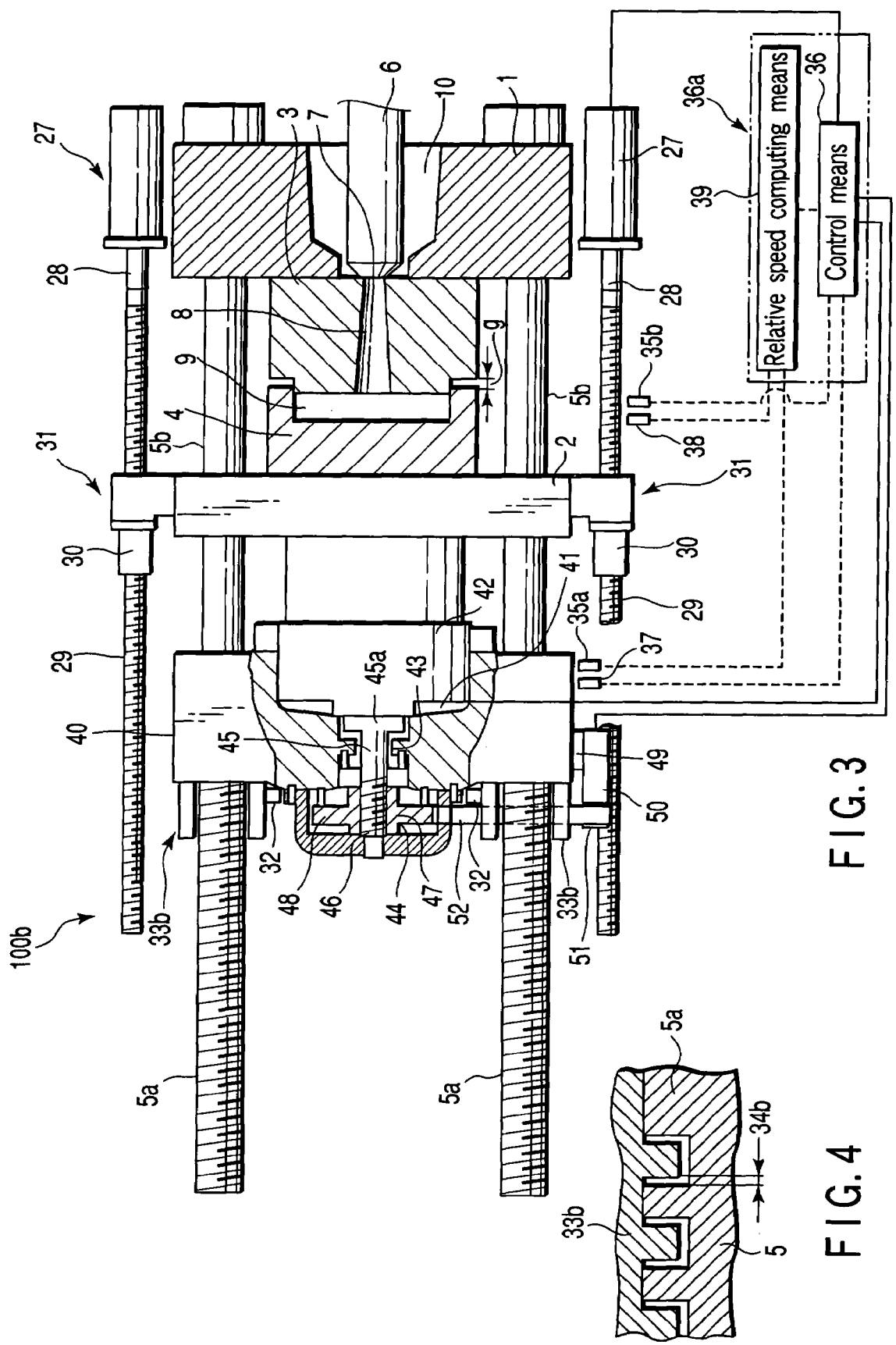

DIE CLAMPING UNIT AND DIE CLAMPING METHOD

CROSS-REFERENCE TO RELATED APPLICATIONS

This application is based upon and claims the benefit of priority from prior Japanese Patent Applications No. 2004-023975, filed Jan. 30, 2004; and No. 2005-011682, filed Jan. 19, 2005, the entire contents of both of which are incorporated herein by reference.

BACKGROUND OF THE INVENTION

1. Field of the Invention

This invention relates to a die clamping unit of an injection molding machine or the like, in which a molded piece is molded by injecting a material into injection molding dies, and a die clamping method, and more particularly, to a die clamping unit and a die clamping method that ensure shortened operating time.

2. Description of the Related Art

A die clamping unit of an injection molding machine or the like, in which a molded piece is molded by injecting a material into injection molding dies, comprises a stationary platen and a movable platen. The stationary platen is fitted with a stationary die. The movable platen is fitted with a movable die. The movable platen is attached to the stationary platen by tie bars. The movable platen can advance toward and recede from the stationary die. An injection molding machine of this type is described in Jpn. Pat. Appln. KOKAI Publication No. 10-296739, for example.

A die clamping unit described in Jpn. Pat. Appln. KOKAI Publication No. 10-296739 further comprises hydraulic die clamping cylinders and tie bar sliding servomotors (halfnut positioning servomotors according to this invention). The hydraulic cylinders are provided on the stationary platen and advance and retreat the tie bars. The tie bar sliding servomotors advance and retreat the tie bars in their axial direction. The movable platen is advanced and retreated on the tie bars by die opening/closing servomotors, and is anchored to the tie bars in a given position by die clamping halfnuts. In an injection pressing process, the hydraulic die clamping cylinders are driven to press the stationary and movable dies together.

Further, a die clamping unit having a die clamping ram is described in Jpn. Pat. Appln. KOKAI Publication No. 6-182838. This die clamping unit comprises a stationary platen, movable platen, die clamping ram, and hydraulic die clamping cylinder. A stationary platen is fitted with a stationary die. The movable platen is fitted with a movable die. The movable platen is attached to the stationary platen by tie bars. The movable platen can advance toward and recede from the stationary die.

The die clamping ram has a fitting portion that projects in its central part and is attached to the movable platen. The fitting portion of the die clamping ram is driven by the hydraulic die clamping cylinder for advance and retreat. In the injection pressing process, an oil pressure is fed into the hydraulic cylinder so that the movable platen is moved by the die clamping ram. By this operation, the stationary and movable dies are pressed together.

A die clamping unit described in Jpn. Pat. Appln. KOKAI Publication No. 2002-127216 further comprises a die clamping mechanism. This mechanism connects and pressurizes a movable platen plate (movable platen according to this invention) and a stationary platen plate (stationary platen according to this invention) by means of tie bars. The die clamping mechanism comprises a two-stage die clamping cylinder, which is composed of large- and small-diameter cylinders, and large- and small-diameter rams. A suitable oil pressure is applied to the large- and small-diameter cylinders to press the stationary and movable dies together. The small-diameter cylinder is operated to remove clearances between sawtooth die clamping halfnuts and sawtooth screw portions of the tie bars. Subsequently, an oil pressure is applied to the large-diameter cylinder to carry out die clamping operation.

The die clamping unit described in Jpn. Pat. Appln. KOKAI Publication No. 10-296739 or No. 6-182838 operates in the following manner. First, the tie bars are advanced or retreated by the tie bar sliding servomotors, and the respective phases of the sawtooth die clamping halfnuts and the sawtooth screw portions of the tie bars are aligned. Subsequently, the die clamping halfnuts and the screw portions are engaged with one another. Thereafter, the hydraulic die clamping cylinders are driven to press the stationary and movable dies together.

In this case, clearances are provided between sawteeth to allow the die clamping halfnuts and the screw portions of the tie bars to smoothly or easily engage one another. When generating a die clamping force, the clearances that result after the halfnuts and the screw portions are engaged need to be removed. More specifically, oil pressure is applied to the hydraulic die clamping cylinders such that a force is transmitted to the halfnuts through the tie bars to remove the clearances between the sawteeth. The removal of the clearances between the sawteeth of the die clamping halfnuts and the screw portions of the tie bars can take a considerable amount of time. Thereafter, the die clamping force is transmitted to the movable platen. Thus, there is a problem that much time is typically required from the start of operation until the die clamping operation because to the time it takes to remove the clearances between sawteeth.

The capacity of the hydraulic die clamping cylinders must be increased in order to obtain a large die clamping force that would quickly remove the clearances between the sawteeth of the die clamping halfnuts and the screw portions of the tie bars. If the cylinder capacity is large, however, a large amount of oil must be supplied to produce the necessary die clamping force and large-sized hydraulic pumps would be needed to provide the oil to the hydraulic die clamping cylinders. Conventional composite die clamping units generally use a lot of hydraulic pumps and feeding a large discharge of oil pressure into the hydraulic cylinders to quickly remove the clearances between the sawteeth is typically not a problem.

For composite die clamping units of hybrid injection molding machines that are currently used, however, the discharge of the hydraulic pumps is is less than in, for example, conventional units, and the motors are miniaturized to limit or reduce power consumption. Thus, in these types of injection molding machines, it takes a lot of time to remove the clearances between the sawteeth.

Like the die clamping unit described in Jpn. Pat. Appln. KOKAI Publication No. 2002-127216, moreover, some die clamping units are provided with a small-diameter cylinder of small capacity besides a large-diameter cylinder. In these die clamping units, the operating time is shortened by performing the operation to remove the clearances between the sawteeth with the small-diameter cylinder. Since the large-diameter cylinder is subjected to the oil pressure after the small-diameter cylinder, however, the application of the oil pressure requires switching operation. Thus, applying the oil pressure is time-consuming, so that the operating time cannot be shortened.

BRIEF SUMMARY OF THE INVENTION

According to this invention, there are provided a die clamping unit and a die clamping method, in which engagement between die clamping halfnuts and engaging portions of tie bar serves to shorten the time before pressure raising is started by applying an oil pressure to hydraulic die clamping cylinders.

A die clamping unit according to an aspect of the invention comprises a stationary platen, movable platen, tie bar, halfnut, halfnut positioning servomotor, engaging mechanism which engages the halfnut with the tie bar, hydraulic die clamping cylinder, and control device. The stationary platen is configured to hold a stationary die. The tie bar is attached to the stationary platen for advance and retreat. The positioning servomotor advances and retreats the tie bar. The movable platen is configured to hold a movable die and can advance toward and recede from the stationary platen. The halfnut is provided on the movable platen and fixes the movable platen and the tie bar together by engaging the tie bar. The hydraulic die clamping cylinder causes the tie bar to press the movable platen against the stationary platen, thereby performing a pressing operation in which the movable die and the stationary die are clamped. The control device controls the halfnut positioning servomotor and the hydraulic die clamping cylinder. The control device drives the halfnut positioning servomotor with the halfnut and the tie bar engaged with each other by the engaging mechanism to cause a clearance between the halfnut and an engaging groove of the tie bar to be removed before the hydraulic die clamping cylinder performs the pressing operation. Furthermore, after or during removal of the clearance, the control device starts controlling the hydraulic die clamping cylinder to cause the tie bar to press the movable platen against the stationary platen, thereby clamping the stationary die and the movable die.

According to this configuration, engagement between the die clamping halfnut and an engaging portion of the tie bar serves to shorten the time before pressure raising is started by applying an oil pressure to the clamping cylinder and improve the operating efficiency.

A die clamping method according to the invention is a method using the die clamping unit described above. In this method, the halfnut positioning servomotor is driven to remove a clearance between the halfnut and an engaging groove of the tie bar with the halfnut and the tie bar engaged with each other by the engaging mechanism. The hydraulic die clamping cylinder is controlled so that the tie bar is caused to press the movable platen against the stationary platen, whereby the stationary die and the movable die are clamped.

In a die clamping method according to a preferred aspect of the invention, the halfnut and the tie bar are first engaged with each other by the engaging mechanism. Then, the halfnut positioning servomotor is driven to remove a clearance between the halfnut and an engaging groove of the tie bar. After the clearance is removed, the hydraulic die clamping cylinder is controlled so that the tie bar is caused to press the movable platen against the stationary platen, whereby the stationary die and the movable die are clamped.

In a die clamping method according to another preferred aspect of the invention, the halfnut and the tie bar are first engaged with each other by the engaging mechanism. Then, the halfnut positioning servomotor is driven to remove a clearance between the halfnut and an engaging groove of the tie bar. The moment the clearance is removed, the hydraulic die clamping cylinder is controlled so that the tie bar is caused to press the movable platen against the stationary platen, whereby the stationary die and the movable die are clamped.

Further, a die clamping unit according to another aspect of the invention comprises a stationary platen, movable platen, tie bar, hydraulic die clamping cylinder, halfnut, halfnut positioning servomotor, engaging mechanism which engages the halfnut with the tie bar, and control device. The stationary platen is configured to hold a stationary die. The tie bar is fixed to the stationary platen. The movable platen is configured to hold a movable die and can advance toward and recede from the stationary platen. The hydraulic die clamping cylinder is opposed to the stationary platen across the movable platen and can advance toward and recede from the stationary platen. The hydraulic cylinder presses the movable platen against the stationary platen, thereby performing a pressing operation in which the movable die and the stationary die are clamped. The positioning servomotor advances and retreats the hydraulic die clamping cylinder. The halfnut is provided on the hydraulic die clamping cylinder and fixes the hydraulic cylinder and the tie bar together by engaging the tie bar. The control device controls the halfnut positioning servomotor and the hydraulic die clamping cylinder. The control device drives the halfnut positioning servomotor with the halfnut and the tie bar engaged with each other by the engaging mechanism to cause a clearance between the halfnut and an engaging groove of the tie bar to be removed before the hydraulic die clamping cylinder performs the pressing operation. Furthermore, after or during the removal of the clearance, the control device starts controlling the hydraulic die clamping cylinder to press the movable platen against the stationary platen, thereby clamping the stationary die and the movable die.

A die clamping method according to another aspect of the invention is a method using the die clamping unit described above. In this method, the halfnut positioning servomotor is driven to remove a clearance between the halfnut and an engaging groove of the tie bar with the halfnut and the tie bar engaged with each other by the engaging mechanism. The hydraulic die clamping cylinder is caused to press the movable platen against the stationary platen, whereby the stationary die and the movable die are clamped.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 is a sectional view showing a die clamping unit of an injection molding machine according to a second embodiment of the invention; and FIG. 4 is a view showing a state of engagement between a die clamping halfnut and a tie bar incorporated in the die clamping unit shown in FIG. 3.

DETAILED DESCRIPTION OF THE INVENTION

Embodiments of this invention will now be described with reference to the accompanying drawings.

Figure 1:
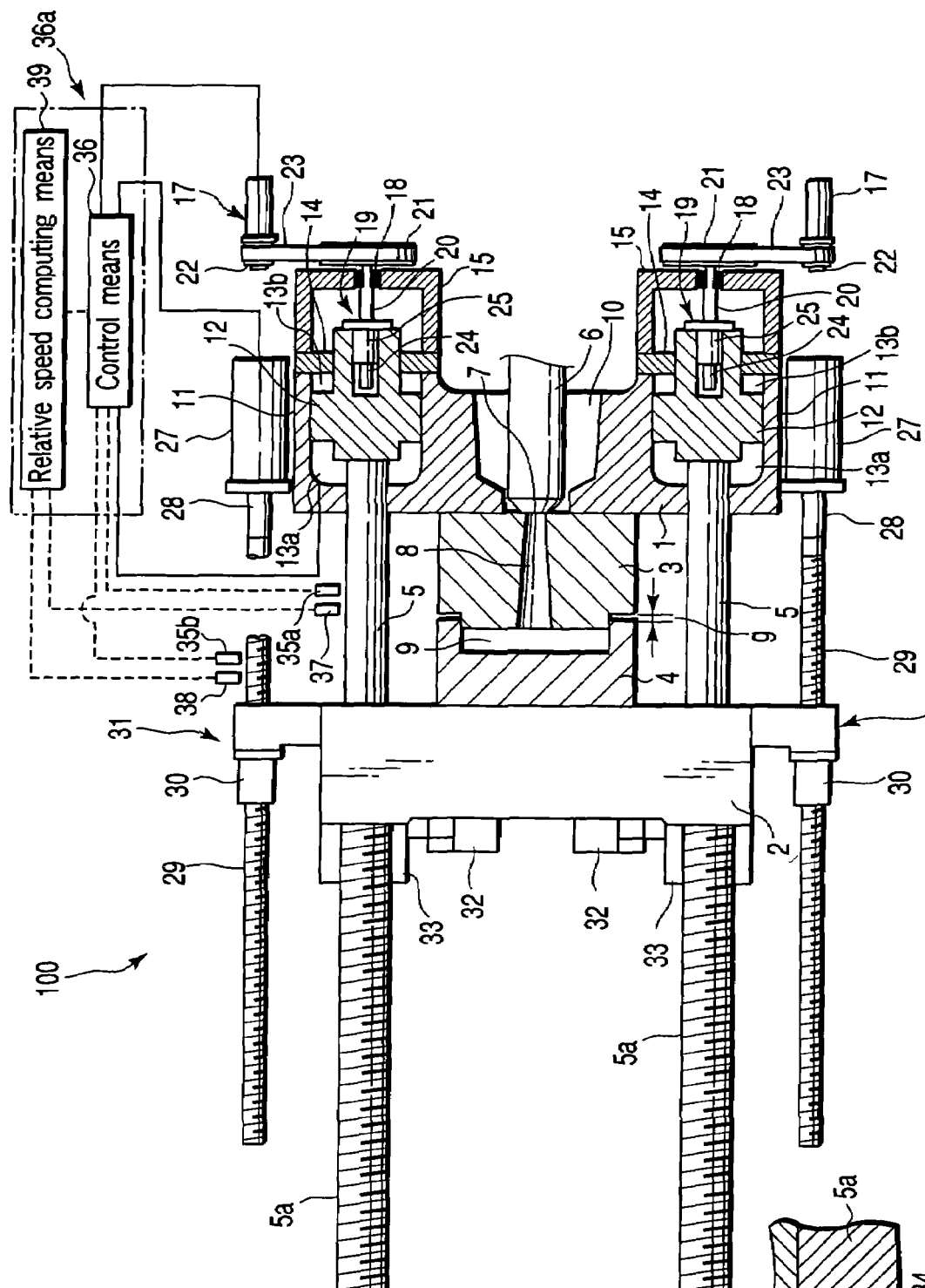
FIG. 1 is a sectional view showing a die clamping unit of an injection molding machine according to a first embodiment of the invention.
Figure 2:
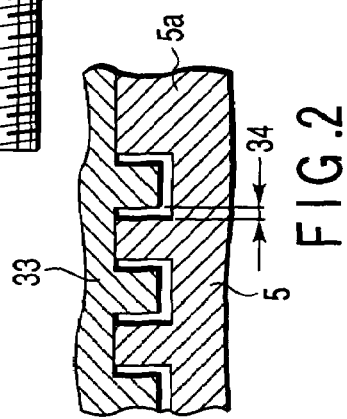
FIG. 2 is a view showing a state of engagement between a die clamping halfnut and a tie bar incorporated in the die clamping unit shown in FIG. 1.

FIG. 1 is a sectional view of a composite die clamping unit 100 of an injection molding machine according to a first embodiment. FIG. 2 is a sectional view showing a state of engagement between a die clamping halfnut and an engaging groove of a tie bar incorporated in the die clamping unit 100.

The composite die clamping unit 100 shown in FIG. 1 comprises a stationary platen 1 and a movable platen 2. The stationary platen 1 is fitted with a stationary die 3. The movable platen 2 is fitted with a movable die 4 that faces the stationary die 3. The stationary platen 1 is provided with a plurality of tie bars 5 that can advance and retreat. The movable platen 2 moves on the tie bars 5 so that it can advance toward or recede from the stationary platen 1.

A nozzle touch face 7 that is jointed to an injection nozzle 6 of an injection unit (not shown) is provided on the rear surface (surface attached to the stationary platen 1) of the stationary die 3. The nozzle touch face 7 communicates with a cavity 9 between the stationary die 3 and the movable die 4 by means of a resin passage 8. The cavity 9 is a space that is defined by the respective die surfaces of the stationary and movable dies 3 and 4 when the dies 3 and 4 are joined together. An opening portion 10 is formed in the rear face of the stationary platen 1. The opening portion 10 opens in a manner such that the injection unit can advance or retreat to allow the injection nozzle 6 to be joined to the nozzle touch face 7 on the stationary die 3.

The stationary platen 1 is provided with hydraulic die clamping cylinders 11 at mounting portions to which the tie bars 5 are attached. A piston portion 12 is fitted in each cylinder 11. It is disposed integrally on the proximal end portion of its corresponding tie bar 5. Thus, the interior of each hydraulic cylinder 11 is divided into two chambers, a die-clamping-side chamber 13a and a die-opening-side chamber 13b, by the piston portion 12. The die-clamping-side chamber 13a is a space that is defined by the inner wall of the hydraulic cylinder 11 and a rod face of the piston portion 12. The die-opening-side chamber 13b is a space that is defined by the inner wall of the cylinder 11 and a head face and the like of the piston portion 12.

Each hydraulic die clamping cylinder 11 is provided with a partition wall 14 for closing a space over the head face of the piston portion 12. Further, a positioning box 15 is provided on the surface of the partition wall 14 opposite from the side on which the cylinder 11 is mounted.

The proximal end portion of the piston portion 12 projects into the positioning box 15 through the partition wall 14. A halfnut positioning servomotor 17 is mounted on the outside of the box 15. Further, a bearing 18 is provided on the rear face (surface on the side opposite from the surface that is attached to the partition wall 14) of the box 15 so as to be coaxial with the piston portion 12. A threaded shaft 20 of a ball screw 19 is rotatably supported by the bearing 18. The ball screw 19 serves as a feed screw. The proximal end portion of the threaded shaft 20 projects from the rear face of the positioning box 15. A driven pulley 21 is fitted on this projecting portion.

Each halfnut positioning servomotor 17 is provided with a driving pulley 22. A timing belt 23 is passed around and between the driving pulley 22 and the driven pulley 21. When the servomotor 17 is driven, therefore, the threaded shaft 20 of the ball screw 19 rotates. A screw portion 24 is provided on the distal end portion of the threaded shaft 20. The screw portion 24 is in threaded engagement with a nut portion 25 that is fitted in an axial part of the piston portion 12. The nut portion 25 constitutes a part of the feed screw 19. Thus, a rotary motion of the threaded shaft 20 of the ball screw 19 can be converted into a linear motion of the piston portion 12 by the nut portion 25.

Further, a plurality of die opening/closing servomotors 27 are mounted on the stationary platen 1 with brackets (not shown). A rotating shaft 28 of each servomotor 27 is provided with a screw portion 29. A nut portion 30 is in threaded engagement with the screw portion 29. The nut portion 30 is fixed to the movable platen 2. The screw portion 29 and the nut portion 30 constitute a ball screw 31 for use as a feed screw. As the servomotor 27 is driven to rotate the screw portion 29, therefore, the movable platen 2 is caused to advance toward or recede from the stationary platen 1 by the nut portion 30. Thus, the movable die 4 is opened or closed with respect to the stationary die 3.

The tie bars 5 project through the movable platen 2. An engaging groove 5a, in the form of a sawtooth, threaded, or annular groove, is provided on the outer peripheral surface of each tie bar 5. A die clamping halfnut 33 that can releasably engage the engaging groove 5a of each tie bar 5 is provided on the rear side of the movable platen 2.

Each halfnut 33 is driven in the radial direction by an open/close cylinder 32. If the halfnut 33 is driven in the direction to engage the engaging groove 5a, the movable platen 2 is fixed to the tie bars 5. If the halfnut 33 is driven in the direction to be disengaged from the engaging groove 5a, the movable platen 2 and the tie bars 5 are released from fixation. When the movable platen 2 and the tie bars 5 are released, the platen 2 is allowed to move in the axial direction of the tie bars 5.

The halfnut 33 and the engaging groove 5a are formed so that a clearance 34 is defined between them when they are in engagement with each other. With this arrangement, they can smoothly engage each other. The clearance 34 is a gap that allows a play in the axial direction of the tie bars.

The die clamping unit 100 of the present embodiment further comprises position sensors 35a and 35b. The position sensor 35a detects the position of the tie bars 5. The position sensor 35b detects the position of the movable platen 2. Furthermore, the die clamping unit 100 comprises control means 36. The control means 36 controls the halfnut positioning servomotors 17 and the die opening/closing servomotors 27. The respective outputs of the position sensors 35a and 35b inputted to the control means 36. Further, the die clamping unit 100 has relative speed computing means 39, which includes speed sensors 37 and 38. The speed sensor 37 detects the movement speed of the tie bars 5. The speed sensor 38 detects the movement speed of the movable platen 2. Outputs for relative speeds that are calculated by the relative speed computing means 39 are inputted to the control means 36. In response to these input signals, the control means 36 controls the halfnut positioning servomotors 17 and the die opening/closing servomotors 27. Also, the control means 36 causes hydraulic control means (not shown) to control the hydraulic cylinder 11. In the present embodiment, the control means 36, relative speed computing means 39, etc. constitute control device 36a.

The following is a description of a die clamping method.

First, the stationary die 3 and the movable die 4 are subjected to mounting and die-thickness adjusting operation.

At the start of the mounting and die-thickness adjusting operation, the engagement between the die clamping halfnuts 33 and the engaging grooves 5a of the tie bars 5 is canceled by the open/close cylinders 32. In this state, the die opening/closing servomotors 27 are driven to perform die closing operation. More specifically, the servomotors 27 are driven to move the movable platen 2 to its die closing limit. Then, the halfnuts 33 are closed by the open/close cylinders 32. Thus, the halfnuts 33 individually mesh with the engaging grooves 5a of the tie bars 5, whereupon the movable platen 2 engages the tie bars 5.

When this is done, the clearances 34 are defined between the die clamping halfnuts 33 and the engaging grooves 5a of the tie bars 5. In order to remove the clearances 34, the halfnut positioning servomotors 17 are driven to rotate the threaded shafts 20 of the ball screws 19. A rotary motion of the threaded shafts 20 is converted into a linear motion of the piston portions 12 by the ball screws 19. The tie bars 5 are pulled in toward the stationary platen 1 by a force that is transmitted as a linear motion to the piston portion 12. Thereupon, the clearances 34 between the die halfnuts 33 and the engaging grooves 5a of the tie bars 5 are reduced to zero. The halfnut positioning servomotors 17 are stopped in this position.

As this is done, the position of the tie bars 5 is read and stored by the position sensor 35a. At the advance limit of the die that is determined by the movable platen 2 during later molding operation, the halfnut positioning servomotors 17 are controlled so that the tie bars 5 are always in the stored position. Thus, the die-thickness adjusting operation is completed.

The following is a description of the injection pressing process that includes the die clamping operation.

After the halfnuts 33 and the engaging grooves 5a of the tie bars 5 engage one another (for the die-thickness adjusting operation), the injection pressing process including the die clamping operation is started. First, the die opening/closing servomotors 27 are driven to advance the movable platen 2 (toward the stationary platen 1). Thereupon, the movable platen 2 is caused to reach an arbitrary position near its die closing limit.

Before a die closing process is started, the tie bars 5 are situated in advance in a position nearer to the movable platen 2 (on the left-hand side of FIG. 1) than the position stored during the die-thickness adjusting operation. When the movable platen 2 reaches the arbitrary position near its die closing limit, the tie bars 5 start to be retreated (or moved to the right of FIG. 1) by the drive of the halfnut positioning servomotors 17.

Thereafter, the speeds of the tie bars 5 and the movable platen 2 are detected by the speed sensors 37 and 38, respectively. The relative speed computing means 39 computes relative speeds in accordance with signals obtained from the sensors 37 and 38. Information on the computed relative speeds is inputted to the control means 36. Based on this information, the control means 36 controls the speeds of the servomotors 17 and 27 so that the relative speeds are synchronous (or that the relative speeds are zero).

When a given position is reached with the relative speeds at zero, the open/close cylinders 32 cause the halfnuts 33 to engage the tie bars 5, individually. Thereupon, the halfnuts 33 and the tie bars 5 engage one another with the clearances 34 reduced to zero.

Then, die clamping and injection pressing operation is started. First, the stationary and movable dies 3 and 4 are clamped with a clearance g equivalent to an amount of press left between them, as shown in FIG. 1. Subsequently, a given amount of molten resin is injected through the injection nozzle 6 of the injection molding machine. The molten resin is filled into the cavity 9 through the resin passage 8. The molten resin is an example of a material.

When filling the molten resin is completed, the injection pressing process is started. More specifically, low-pressure pressing is performed first, and high-pressure pressing is then carried out. In the low-pressure operation, the halfnut positioning servomotors 17 are driven to cause the ball screws 19 to retreat the tie bars 5 (or move the tie bars to the right of FIG. 1). Thus, the movable die 4 is pressed against the stationary die 3 by the movable platen 2, whereby the molten resin in the cavity 9 is pressurized.

Then, hydraulic oil is introduced into the die-clamping-side chambers 13a of the hydraulic cylinders 11. As the hydraulic oil is introduced in this manner, the tie bars 5 generate a high-pressure die clamping force. With this high-pressure die clamping force, the molten resin in the cavity 9 is pressed under high pressure. Thus, the clearance g equivalent to the amount of press is reduced to zero. Then, a molded piece is molded after undergoing dwelling and cooling processes. During the high-pressure pressing operation using the hydraulic cylinders 11, the drive of the halfnut positioning servomotors 17 may be either continued or stopped.

After the molded piece is molded, a die opening process is started. Pressure oil in the die-clamping-side chambers 13a of the hydraulic die clamping cylinders 11 is discharged, and pressure oil in the die-opening-side chambers 13b is introduced. On the other hand, the die opening/closing servomotors 27 are driven to cause the ball screws 31 to retreat (or move to the left of FIG. 1) the movable platen 2. Thereupon, the stationary and movable dies 3 and 4 are opened to allow the molded piece to be taken out. Also, the die clamping halfnuts 33 and the engaging grooves 5a of the tie bars 5 are disengaged from one another during the die opening operation. At the same time, the halfnut positioning servomotors 17 are reversely driven to advance the tie bars 5 (or move them to the left of FIG. 1). Thus, one cycle of injection molding operation is completed.

According to the first embodiment, the clearances 34 between the die clamping halfnuts 33 and the engaging grooves 5a of the tie bars 5 are reduced to zero by the halfnut positioning servomotors 17 before the die clamping and injection pressing operation is started. Thus, die clamping and pressure raising operation can be immediately started by the operation of the hydraulic die clamping cylinders 11, so that the operating time can be shortened.

Also in the aforementioned die clamping unit described in Jpn. Pat. Appln. KOKAI Publication No. 10-296739, the position of the tie bars is adjusted by the tie bar sliding servomotors when the halfnuts and the screw portions of the tie bars are engaged with one another.

However, this operation is performed in order to correct misengagement, if any, between the halfnuts and the screw portions of the tie bars. Since the thread pitch of the halfnuts is different from that of the screw portions of the tie bars, their respective thread tops may possibly be combined without the adjustment of the tie bars. In the die clamping unit described in Jpn. Pat. Appln. KOKAI Publication No. 10-296739, the position of the tie bars is adjusted so that their thread tops are combined individually with the thread bottoms of the halfnuts. Even if the tie bars are not adjusted, this operation need not be carried out when the thread tops are combined with the thread bottoms.

According to this invention, on the other hand, the position of the tie bars 5 is adjusted in order to remove the clearances 34 between the halfnuts 33 and the engaging grooves 5a of the tie bars 5 that are in engagement with one another. In other words, the object of the adjustment of the position of the tie bars 5 according to this invention is to shorten the molding cycle. Thus, the present invention is clearly different from the prior art techniques described in the aforementioned publications.

FIG. 3 is a sectional view of a composite die clamping unit 100*b* of an injection molding machine according to a second embodiment. FIG. 4 is a sectional view showing a state of engagement between a die clamping halfnut and an engaging groove of a tie bar incorporated in the die clamping unit 100*b*. Like numerals are used to designate the same components as those of the injection molding machine of the first embodiment, and a description of those components is omitted.

In the die clamping unit 100*b* according to the present embodiment, a hydraulic die clamping cylinder 40 is provided behind (on the left-hand side of FIG. 3) a movable platen 2 that is supported by a plurality of tie bars 5*b*. The hydraulic cylinder 40 is independent of the movable platen 2. The cylinder 40 is provided with a hydraulic chamber 41 that opens toward the movable platen 2. A die clamping ram 42 is fitted in the hydraulic chamber 41 so as to be movable toward or away from a stationary platen 1. The distal end portion of the ram 42 is coupled to the movable platen 2.

A stepped through hole 43 is formed in the back of the hydraulic die clamping cylinder 40 so as to extend in series with the hydraulic chamber 41. A threaded shaft 45 that constitutes a ball screw 44 as a feed screw is inserted in the through hole 43 for advance and retreat. A flange portion 45*a* is provided on the ram-side end portion of the threaded shaft 45. The flange portion 45*a* is coupled to the die clamping ram 42. The other end portion of the threaded shaft 45 projects rearward (or to the left-hand side of FIG. 3) from the hydraulic cylinder 40. A screw portion 46 is formed on the projecting portion. A nut portion 47 that constitutes the ball screw 44 is threadedly fitted on the screw portion 46. A driven pulley 48 is fitted integrally on the nut portion 47.

A halfnut positioning servomotor 50 is mounted on the hydraulic die clamping cylinder 40 by a bracket 49. The servomotor 50 is provided with a driving pulley 51. A timing belt 52 is passed around and between the driving pulley 51 and the driven pulley 48. When the servomotor 50 is driven, therefore, the nut portion 47 of the ball screw 44 rotates. A rotary motion of the nut portion 47 is converted into a linear motion by the ball screw 44. This linear motion serves to advance and retreat axially the die clamping ram 42 that is fixed to the threaded shaft 45.

Provided on the rear face side of the hydraulic die clamping cylinder 40, moreover, are die clamping halfnuts 33*b* that can releasably engage engaging grooves 5*a* of the tie bars 5*b*. The tie bars 5*b* are fixed to the stationary platen 1.

The following is a description of a die clamping method.

First, die closing operation for die-thickness adjusting operation is carried out by driving die opening/closing servomotors 27. In this case, the movable platen 2 is moved to its die closing limit by the servomotors 27. Since the die clamping ram 42 that is then in the hydraulic die clamping cylinder 40 is attached to the movable platen 2, the hydraulic cylinder 40 is moved integrally with the movable platen 2.

Then, the halfnuts 33*b* are closed by open/close cylinders 32. Thus, the halfnuts 33*b* individually mesh with the engaging grooves 5*a* of the tie bars 5*b*, whereupon the movable platen 2 engages the tie bars 5*b*.

When this is done, clearances 34*b* are defined between the die clamping halfnuts 33*b* and the engaging grooves 5*a* of the tie bars 5*b*. In order to remove the clearances 34*b*, the halfnut positioning servomotor 50 is driven to rotate the nut portion 47. A rotary motion of the nut portion 47 is converted into a linear motion and transmitted to the threaded shaft 45. The force transmitted to the threaded shaft 45 is a force that urges the shaft to move in an advance direction (or to the right of FIG. 3). However, the threaded shaft 45 is fixed to the movable platen 2 with the die clamping ram 42, and the platen 2 is at its die closing limit. Therefore, the threaded shaft 45 cannot move in the advance direction. In consequence, the hydraulic die clamping cylinder 40 is moved in a retreat direction (or to the left of FIG. 3) by a reaction force from the threaded shaft 45. Thereupon, the clearances 34*b* between the die halfnuts 33*b* and the engaging grooves 5*a* of the tie bars 5*b* are reduced to zero. The halfnut positioning servomotor 50 is stopped in this position.

Then, a die clamping and injection pressing process is started. First, the stationary and movable dies 3 and 4 are clamped with a clearance g equivalent to an amount of press left between them, as shown in FIG. 3, in the same manner as in the first embodiment. Thereafter, a given amount of molten resin is injected through the injection nozzle 6 of the injection molding machine. Thereupon, the molten resin is filled into a cavity 9 through a resin passage 8.

When filling the molten resin is completed, an injection pressing process is started. More specifically, low-pressure pressing is performed first, and high-pressure pressing is then carried out. In the low-pressure operation, the halfnut positioning servomotor 50 is driven to cause the ball screw 44 to press the die clamping ram 42 toward the stationary platen (or to the right of FIG. 3). Thus, the movable die 4 is pressed against the stationary die 3 by the movable platen 2, whereby the molten resin in the cavity 9 is pressurized.

Then, hydraulic oil is introduced into the hydraulic chamber 41 of the hydraulic die clamping cylinder 40. As the hydraulic oil is introduced in this manner, the die clamping ram 42 generates a high-pressure die clamping force. With this high-pressure die clamping force, the molten resin in the cavity 9 is pressed under high pressure, whereupon the clearance g equivalent to the amount of press is reduced to zero. Then, a molded piece is molded after undergoing dwelling and cooling processes. During the high-pressure pressing operation using the hydraulic cylinder 40, the drive of the halfnut positioning servomotor 50 may be either continued or stopped.

After the molded piece is molded, a die opening process is started, and pressure oil in the hydraulic chamber 41 of the hydraulic die clamping cylinder 40 is discharged. On the other hand, the die opening/closing servomotors 27 are driven to cause the ball screws 31 to move the movable platen 2 in a retreat direction (or to the left of FIG. 3). Thereupon, the stationary and movable dies 3 and 4 are opened to allow the molded piece to be taken out. Also, the die clamping halfnuts 33*b* and the engaging grooves 5*a* of the tie bars 5 are disengaged from one another during the die opening operation. At the same time, the halfnut positioning servomotor 50 is reversely driven to move the die clamping ram 42 in the retreat direction (or to the left of FIG. 3). Thus, one cycle of injection molding operation is completed.

According to the second embodiment, the clearances 34*b* between the die clamping halfnuts 33*b* and the engaging grooves 5*a* of the tie bars 5*b* are reduced to zero by the halfnut positioning servomotor 50 before the die clamping and injection pressing operation is started. Thus, die clamping and pressure raising operation can be immediately started by the operation of the hydraulic die clamping cylinder 40, so that the operating time can be shortened.

Although the pulleys and the belt are used to transfer power between the halfnut positioning servomotors and the ball screws in the first and second embodiments, moreover, gears may alternatively be used for power transmission. Further, the ball screws may be replaced with any other screws or screw mechanisms, planetary roller screws, which can convert a rotary motion into a linear motion.

In the first and second embodiments, furthermore, the clearances between the die clamping halfnuts and the engaging grooves of the tie bars are reduced to zero by the halfnut positioning servomotors before the die clamping and pressure raising operation is performed by the hydraulic die clamping cylinders. Alternatively, however, the die clamping and pressure raising operation may be carried out by applying oil pressure to the hydraulic cylinders the moment the clearances between the halfnuts and the engaging grooves of the tie bars are reduced to zero by the halfnut positioning servomotors.

Although the die clamping method for the injection molding machine has been described above, this invention may be also applied to a die cast machine, pressing machine, etc., for example.

This invention is not limited directly to the embodiments described herein, and the components may be modified without departing from the spirit of the invention. Further, various inventions may be made by suitably combining a plurality of components described in connection with the foregoing embodiments. For example, some of the components according to the foregoing embodiments may be omitted. Furthermore, the components according to the different embodiments may be combined as required.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A die clamping unit comprising:
a stationary platen configured to hold a stationary die;
a tie bar attached to the stationary platen for advance and retreat;
a halfnut positioning servomotor which advances and retreats the tie bar;
a movable platen configured to hold a movable die and capable of advancing toward and receding from the stationary platen;
a halfnut which is provided on the movable platen and fixes the movable platen and the tie bar together by engaging the tie bar;
an engaging mechanism which engages the halfnut with the tie bar;
a hydraulic die clamping cylinder which causes the tie bar to press the movable platen against the stationary platen, thereby performing a pressing operation in which the movable die and the stationary die are clamped; and
a control device which controls the halfnut positioning servomotor and the hydraulic die clamping cylinder,
wherein the control device drives the halfnut positioning servomotor with the halfnut and the tie bar engaged with each other by the engaging mechanism to cause a clearance between the halfnut and an engaging groove of the tie bar to be removed before the hydraulic die clamping cylinder performs the pressing operation, and after or during removal of the clearance, the control device starts controlling the hydraulic die clamping cylinder to cause the tie bar to press the movable platen against the stationary platen, thereby clamping the stationary die and the movable die.

2. A die clamping unit comprising:
a stationary platen configured to hold a stationary die;
a tie bar fixed to the stationary platen;
a movable platen configured to hold a movable die and capable of advancing toward and receding from the stationary platen;
a hydraulic die clamping cylinder which is opposed to the stationary platen across the movable platen, can advance toward and recede from the stationary platen, and presses the movable platen against the stationary platen, thereby performing a pressing operation in which the movable die and the stationary die are clamped;
a halfnut positioning servomotor which advances and retreats the hydraulic die clamping cylinder;
a halfnut which is provided on the hydraulic die clamping cylinder and fixes the hydraulic die clamping cylinder and the tie bar together by engaging the tie bar;
an engaging mechanism which engages the halfnut with the tie bar; and
a control device which controls the halfnut positioning servomotor and the hydraulic die clamping cylinder,
wherein the control device drives the halfnut positioning servomotor with the halfnut and the tie bar engaged with each other by the engaging mechanism to cause a clearance between the halfnut and an engaging groove of the tie bar to be removed before the hydraulic die clamping cylinder performs the pressing operation, and after or during removal of the clearance, the control device starts controlling the hydraulic die clamping cylinder to press the movable platen against the stationary platen, thereby clamping the stationary die and the movable die.

* * * * *